a2

United States Patent
Williams

(10) Patent No.: US 8,280,461 B2
(45) Date of Patent: Oct. 2, 2012

(54) ELECTRONIC DEVICE INCLUDING A FUNCTION BUTTON OPERABLE BY A STYLUS OR SIMILAR DEVICE

(75) Inventor: Rodney Owen Williams, Cary, NC (US)

(73) Assignee: Sony Mobile Communications AB, Lund (SE)

( * ) Notice: Subject to any disclaimer, the term of this patent is extended or adjusted under 35 U.S.C. 154(b) by 412 days.

(21) Appl. No.: 12/410,869

(22) Filed: Mar. 25, 2009

(65) Prior Publication Data

US 2010/0248776 A1    Sep. 30, 2010

(51) Int. Cl.
| H04M 1/00 | (2006.01) |
| H04B 1/38 | (2006.01) |
| G06F 3/033 | (2006.01) |
| G09G 5/00 | (2006.01) |
| H04N 5/225 | (2006.01) |
| G03B 17/02 | (2006.01) |
| G03B 17/00 | (2006.01) |
| H04M 9/00 | (2006.01) |

(52) U.S. Cl. ............ 455/575.1; 455/556.2; 455/90.2; 455/90.3; 345/179; 345/184; 348/373; 348/375; 348/376; 396/535; 396/540; 396/543; D14/341; D14/342; 379/433.06; 379/440

(58) Field of Classification Search .......... None
See application file for complete search history.

(56) References Cited

U.S. PATENT DOCUMENTS

| 6,102,585 | A | * | 8/2000 | Kataoka et al. ............... 396/439 |
| 6,924,791 | B1 | * | 8/2005 | Nicolas et al. ............... 345/179 |
| 7,053,883 | B1 | * | 5/2006 | Kwok et al. .................. 345/156 |
| 2004/0100457 | A1 | * | 5/2004 | Mandle .......................... 345/179 |
| 2006/0112118 | A1 | * | 5/2006 | Lasensky et al. ............. 707/101 |
| 2009/0023473 | A1 | * | 1/2009 | Sawayama et al. ........ 455/556.1 |

FOREIGN PATENT DOCUMENTS

| DE | 102005005909 A1 | | 2/2005 |
| EP | 1635421 A1 | | 9/2005 |
| EP | 1635421 A1 | * | 3/2006 |
| WO | WO 2007037760 A1 | * | 4/2007 |

OTHER PUBLICATIONS

English language machine translation for DE 102005005909 A1 (Reference provided by the applicant in IDS), Mar. 23, 2006.*
International Search Report, Patent Cooperation Treaty, Apr. 12, 2009.
International Preliminary Report on Patentability; Oct. 6, 2011; issued in International Patent Application No. PCT/US2009/057296.

* cited by examiner

*Primary Examiner* — Lester Kincaid
*Assistant Examiner* — Nalini Yerneni
(74) *Attorney, Agent, or Firm* — Patrick B. Horne; Moore & Van Allen PLLC

(57) ABSTRACT

An electronic device may include a stylus and a housing. An opening may be formed in the housing for inserting and storing the stylus. A function button may be mounted in the housing. The stylus may be adapted to operate the function button when in a stored position inserted within the opening in response to a user applying a predetermined pressure to the stylus.

21 Claims, 6 Drawing Sheets

ELECTRONIC DEVICE INCLUDING A FUNCTION BUTTON OPERABLE BY A STYLUS OR SIMILAR DEVICE

BACKGROUND

The present invention is related to electronic devices, such as mobile communications devices and the like, and more specifically to an electronic device or mobile communications device including a function button operable by a stylus or similar device.

Electronic devices, such as mobile communications devices and the like, have evolved to be able to perform multiple different functions. The cellular telephones or mobile communications devices of today do much more than merely provide wireless two-way voice communications. Many are virtually handheld computers which permit access to email, include browsers for surfing the Internet, have instant messaging communications capability, and other functions, such as music playback and multimedia features. Many of these devices include interactive or touch screens to allow access and control of the different functions. The screen size is usually limited to facilitate portability and the ability to be handheld. A stylus or similar point instrument may be provided to allow finer resolution interaction with the touch screen and other operational features of the device than with a user's fingertip. Many of these devices also incorporate cameras for taking digital photographs and videos. Because of the small size of these handheld devices, places to locate function buttons and other control mechanisms for controlling the operation of these multiple different features in addition to the display, keypad and other user-device interface features can present a challenge. Efficient use of the available space on the exterior of these electronic devices helps maintain their compactness, portability and ease of use.

SUMMARY

According to one aspect of the present invention, an electronic device may include a stylus or similar instrument and a housing. An opening may be formed in the housing for inserting and storing the stylus. A function button may be mounted in the housing. The stylus may be adapted to operate the function button when in a stored position inserted within the opening in response to a user applying a predetermined pressure to the stylus.

According to another aspect of the present invention, a mobile communications device may include a housing. A transmitter and a receiver are contained in the housing for establishing two way wireless communications. A processor is contained in the housing for controlling operation of the communications device. A opening may be formed in the housing for inserting and storing a stylus. A function button may be mounted in the housing. The stylus may be adapted to operate the function button when in a stored position inserted within the opening in response to a user applying a predetermined pressure to the stylus.

According to a further aspect of the present invention, a method for operating a function button mounted in an electronic device may include inserting a stylus or similar instrument into a stored position through an opening formed in a housing of the electronic device. The method may also include operating the function button in response to a user applying a predetermined pressure to the stylus in the stored position. The stylus is positioned relative to the function button when the stylus is in the stored position to permit operation of the function button when the predetermined pressure is applied to the stylus.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings.

DETAILED DESCRIPTION

The following detailed description of embodiments refers to the accompanying drawings which illustrate specific embodiments of the invention. Other embodiments having different structures and operations do not depart from the scope of the present invention.

Figure 1:
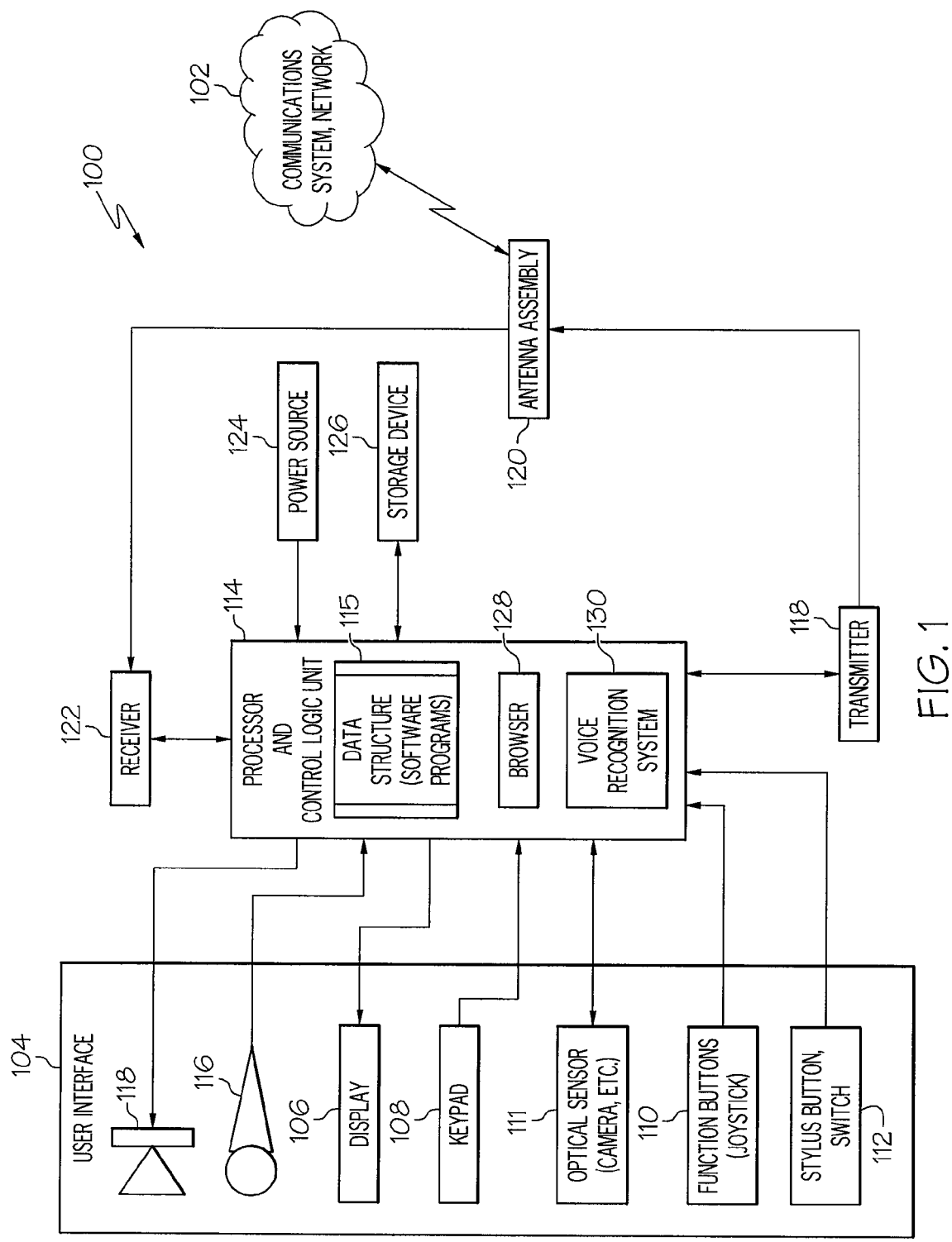
FIG. 1 is a block diagram of an example of an electronic device according to an exemplary embodiment of the present invention.

FIG. 1 is a block diagram of an example of an electronic device according to an exemplary embodiment of the present invention. The particular electronic device shown in FIG. 1 is a mobile communications device 100 operable in association with a communication system or wireless network 102. The communication system or network 102 may be a mobile, wireless, cellular communication system or similar system. The communication device 100 may be a cordless telephone, cellular telephone, personal digital assistant (PDA), communicator, computer device or the like and is not unique to any particular communication standard, such as Advanced Mobile Phone Service (AMPS), Digital Advanced Mobile Phone Service (D-AMPS), Global System for Mobile Communications (GSM), Code Division Multiple Access (CDMA) or the like. The layout illustrated in FIG. 1 is for purposes of explaining the present invention and the present invention is not limited to any particular design.

The communication device 100 may include an operator or user interface 104 to facilitate controlling operation of the communication device 100 including initiating and conducting phone calls and other communications. The user interface 104 may include a display 106 to provide visual signals to a subscriber or user as to the status and operation of the communication device 100. The display 106 may be a liquid crystal display (LCD) or the like capable of presenting color images. The display 106 may provide information to a user or operator in the form of images, text, numerals, characters, a graphical user interface (GUI) and the like. The display 106 may be touch screen to permit interaction with any GUI's or other interactive features that may be presented on the display. As described herein, a stylus (not shown in FIG. 1) or other instrument may be used to facilitate contacting and controlling features presented on the touch screen display 106 or to contact and operate other keys, buttons or features of the communications device 100.

The user interface 104 may also include a keypad 108 and function keys or buttons 110 including a point device, such as a joystick, navigation button or the like. The keypad 108, function buttons and joystick 110 permit the user to communicate commands to the communication device 100 to dial phone numbers, initiate and terminate calls, establish other communications, such as access to the Internet, send and receive email, text messages and the like. The keypad 108, function buttons and joystick 110 may also be used to control other operations of the communication device 100.

The communications device 100 or electronic device may also include an optical sensor or camera 111 for taking photographs or videos. The communications device may also include a function button 112 or switch that may be operated by the stylus when the stylus is in a stored position inserted into an opening in a housing of the communications device 100 similar to that described in more detail herein. The function button 112 may operate a shutter of the camera 110 to take a photograph or video clip. Alternatively, the function button 112 may operate some other feature of the communications device 100 or the function button may be programmable to operate the camera 111 or some other feature.

The display 106, keypad 108, function buttons 110, camera 111, and stylus button 112 or switch may be coupled to a main processor and control logic unit 114. The main processor and control logic unit 114 may be a microprocessor or the like. The main processor and logic unit 114 may include data structures 115, software programs, computer applications and the like to encode and decode control signals, perform communication procedures and other functions as described herein.

The user interface 104 may also include a microphone 116 and a speaker 118. The microphone 116 may receive audio or acoustic signals from a user or from some other acoustic source. The microphone 116 may convert the audio or acoustic signals to electrical signals. The microphone 116 may be connected to the main processor and logic unit 114 wherein the main processor and logic unit 114 may convert the electrical signals to baseband communication signals. The main processor and control logic unit 114 may be connected to a transmitter 118 that may convert baseband signals from the main processor and control logic unit 114 to radio frequency (RF) signals. The transmitter 118 may be connected to an antenna assembly 120 for transmission of the RF signals to the communications system or network 102.

The antenna assembly 120 may receive RF signals over the air and transfer the RF signals to a receiver 122. The receiver 122 may convert the RF signals to baseband signals. The baseband signals may be applied to the main processor and control logic unit 114 which may convert the baseband signals to electrical signals. The processor and control unit 114 may send the electrical signals to the speaker 118 which may convert the electrical signals to audio signals that can be understood by the user.

A power source 124 may be connected to the main processor and control logic unit 114 to provide power for operation of the communication device 100. The power source 124 may be a rechargeable battery or the like. The communication device 100 may also include at least one data storage device 126 or medium. The data storage device 126 may store lists of phone numbers. The data storage device 126 may be a computer-readable medium to store computer-executable or computer-usable instructions or data structures, such as data structures 115, to perform special operations or functions such as those described in accordance with embodiments of the present invention. The data storage device 126 may also store photographs or videos captured by the camera 111.

The communications device 100 may also include a browser 128 for accessing the Internet or other network. The communications device 100 may further include a voice recognition system 130. The voice recognition system 130 may permit interaction with the communications device 100 or control of the communications device 100 using voice commands.

Figure 2:
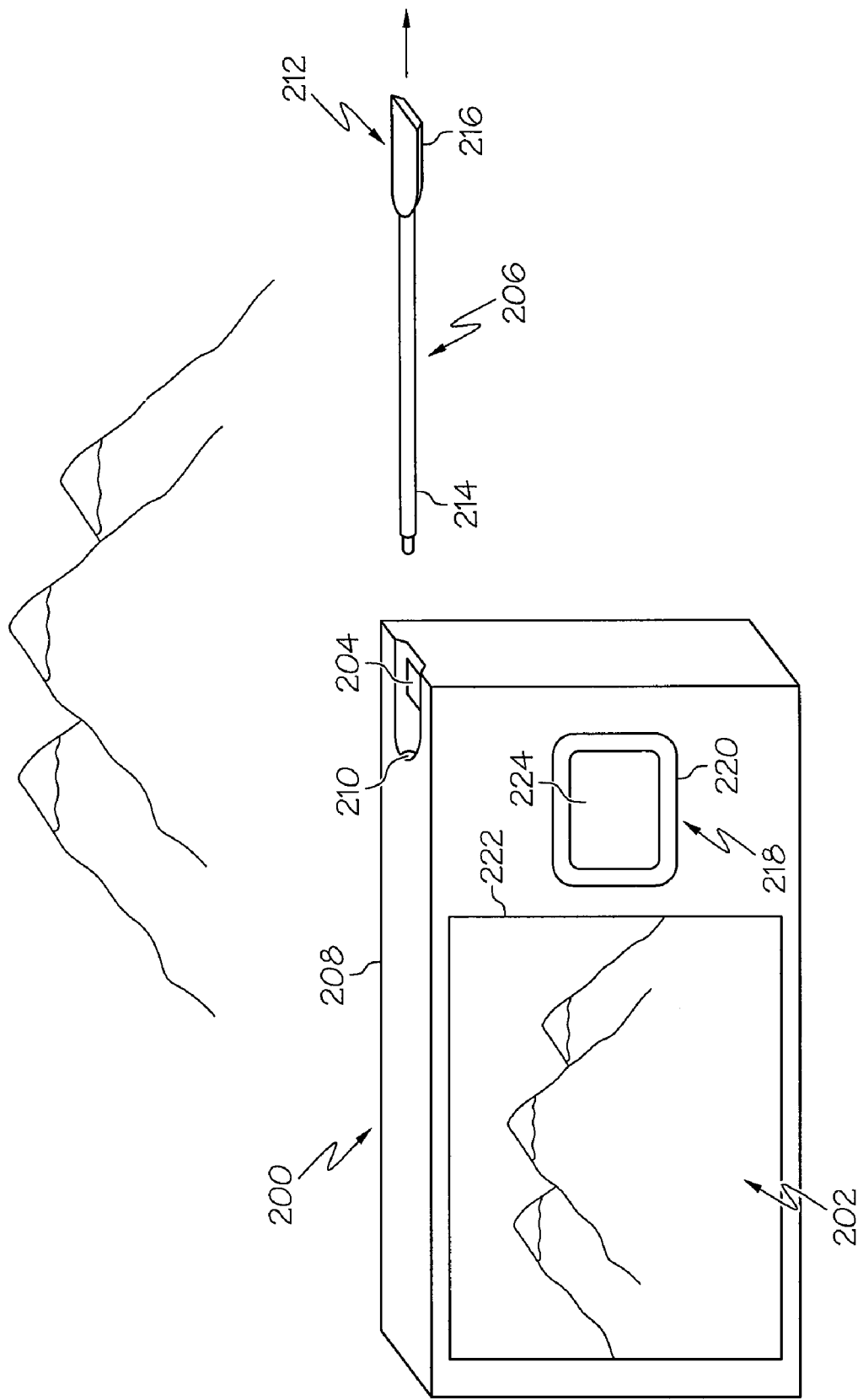
FIG. 2 is a diagram of an example of an electronic device including a camera feature and a function button operable by a stylus or other device according to an exemplary embodiment of the present invention.

FIG. 2 is a diagram of an electronic device 200 including a camera feature 202 and a function button 204 operable by a stylus 206 or other device or instrument according to an exemplary embodiment of the present invention. The electronic device 200 may be communications device or mobile communications device similar to that shown in FIG. 1. The electronic device 200 may include a housing 208. An opening 210 may be formed in the housing 208 for inserting and storing the stylus 206. The function button 204 or switch may be mounted in the housing 208. The stylus 206 is adapted or formed to operate the function button 204 when the stylus 206 is in a stored position inserted substantially completely within the opening 210 and in response to a user applying a predetermined pressure to the stylus 206. The function button 204 and the opening 210 may be positioned proximate to one another to permit the stylus 206 to depress or activate the function button 204. The function button 204 may be depressed or activated by the stylus 206 in the stored position when an exposed portion 212 of the stylus 206 extending outside of the housing 208 (best shown in FIG. 3A) is depressed or pushed toward the housing 208 with the predetermined pressure or force. This causes the exposed portion 212 of stylus 206 to deflect against the function button 204 causing operation or depression of the function button 204 and performance of whatever function the button 204 controls, such as the camera feature 202 of the electronic device 200 or some other function. While the present invention is described with respect to a stylus, any sort of device or instrument capable of operating as described herein may be used and the invention is not intended to be limited by use of the term stylus.

Figure 3A:
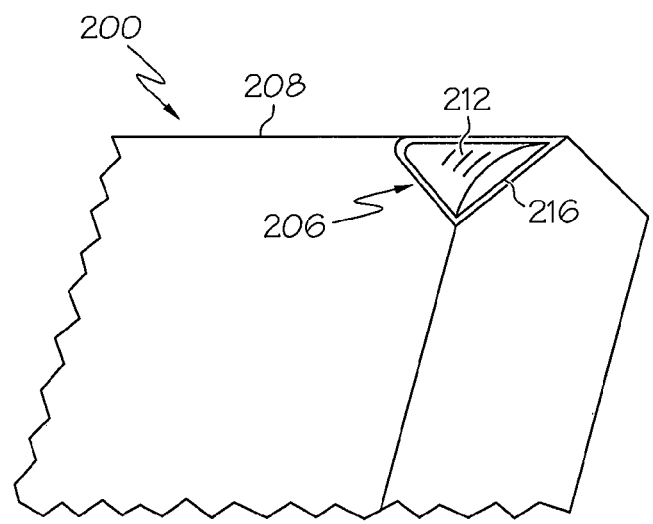
FIG. 3A is a detailed partial perspective view of the electronic device of FIG. 2 illustrating the stylus or other device in a stored position for operating the function button according to an exemplary embodiment of the present invention.
Figure 3B:
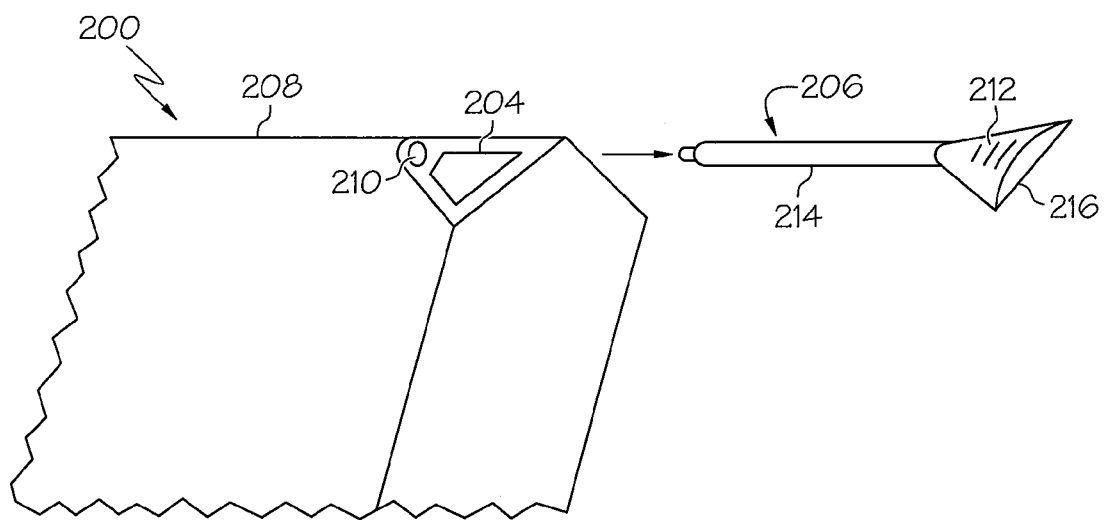
FIG. 3B is a detailed partial perspective view of the electronic device of FIG. 2 illustrating the stylus or other device removed from the electronic device according to an exemplary embodiment of the present invention.

Referring also to FIGS. 3A and 3B, FIG. 3A is a detailed partial perspective view of the electronic device 200 of FIG. 2 illustrating the stylus 206 in a stored position for operating the function button 204. FIG. 3B is a detailed partial perspective view of the electronic device 200 of FIG. 2 illustrating the stylus 206 removed from the electronic device 200. As shown in FIGS. 2 and 3B, the function button 204 may be accessible for operation directly by the user's finger when the stylus 206 is removed from the opening 210.

The stylus 206 may include an elongated portion 214 including a cross-section corresponding substantially to a shape or compatible with the shape of the opening 210 formed in the housing 208. The elongated portion 214 may then be received through the opening 210 and into an interior of the housing 208 for storage. The stylus 206 may also include a head portion 216 extending from the elongated portion 214.

As previously discussed, the function button 204 is mounted in the housing 208 at a location proximate to the opening 210 such that the head portion 216 or exposed portion 212 of the stylus 206 is disposed or positioned adjacent to the function button 204 when the elongated portion 214 of the stylus 206 is substantially completely inserted into the opening 210 for storage. In this position, the head portion 216 may contact and operate the function button 204 in response to the user applying the predetermined pressure or force to the head portion 216 or exposed portion 212 of the stylus 206. The head portion 216 is resiliently attached or formed to the elongated portion 214 to permit the head portion 216 to move or deflect relative to the elongated portion 214 when the stylus 206 is in the stored position for operating the function button 204 and when force or pressure is applied to the head portion 216 to cause it to deflect.

The head portion 216 of the stylus 206 may include a predetermined shape to facilitate operation of the function button 204. The predetermined shape of the head portion 216 may include a cross-section wider than the cross-section of the elongated portion 214 of the stylus 206. Accordingly, the cross-section of elongated portion 214 may be substantially narrower or smaller than the head portion 216 to permit the smaller or narrower elongated portion 214 to be inserted in the opening 210. The head portion 216 may then act as a stop for the stylus 206 and position the head portion 216 adjacent the function button 204 for operation of the function button 204 when the predetermined force is applied to the head portion 216 by the user. The broader head portion 216 may also provide of wider surface area for the user to place his finger for applying the pressure or force to operate the function button 204 aligned beneath the head portion 216.

Referring back to FIG. 2, the electronic device 200 may also include a joystick or navigation interface 218. The navigation interface 218 may include an outer rim segment 220 forming a multi-position switch, 4-way position switch or rocker type switch which may move a cursor, highlight selection feature or other means of selecting different options or features that may be presented in a display 222. The navigation interface 218 may be analog or optical in nature or operation which may move a cursor, include a highlight selection feature or other means of selecting different options or features that may be presented in a display 222. The navigation interface 218 may also include a center segment 224 that may be used to actually select a feature presented on the display 222 that may have been highlighted or otherwise identified by operation of the navigation interface 218 or outer rim segment 220. The navigation interface 218 may also operate as a function button for operating the camera feature 202 or other function when the stylus 206 is not in the stored position. In another embodiment, either the navigation interface 218 or the stylus 206 in the stored position may be operated to take a photograph or video. Similarly, if the stylus 206 is removed, the exposed function button 204 or the navigation interface 218 may be used to operate the camera feature 202.

Figure 4:
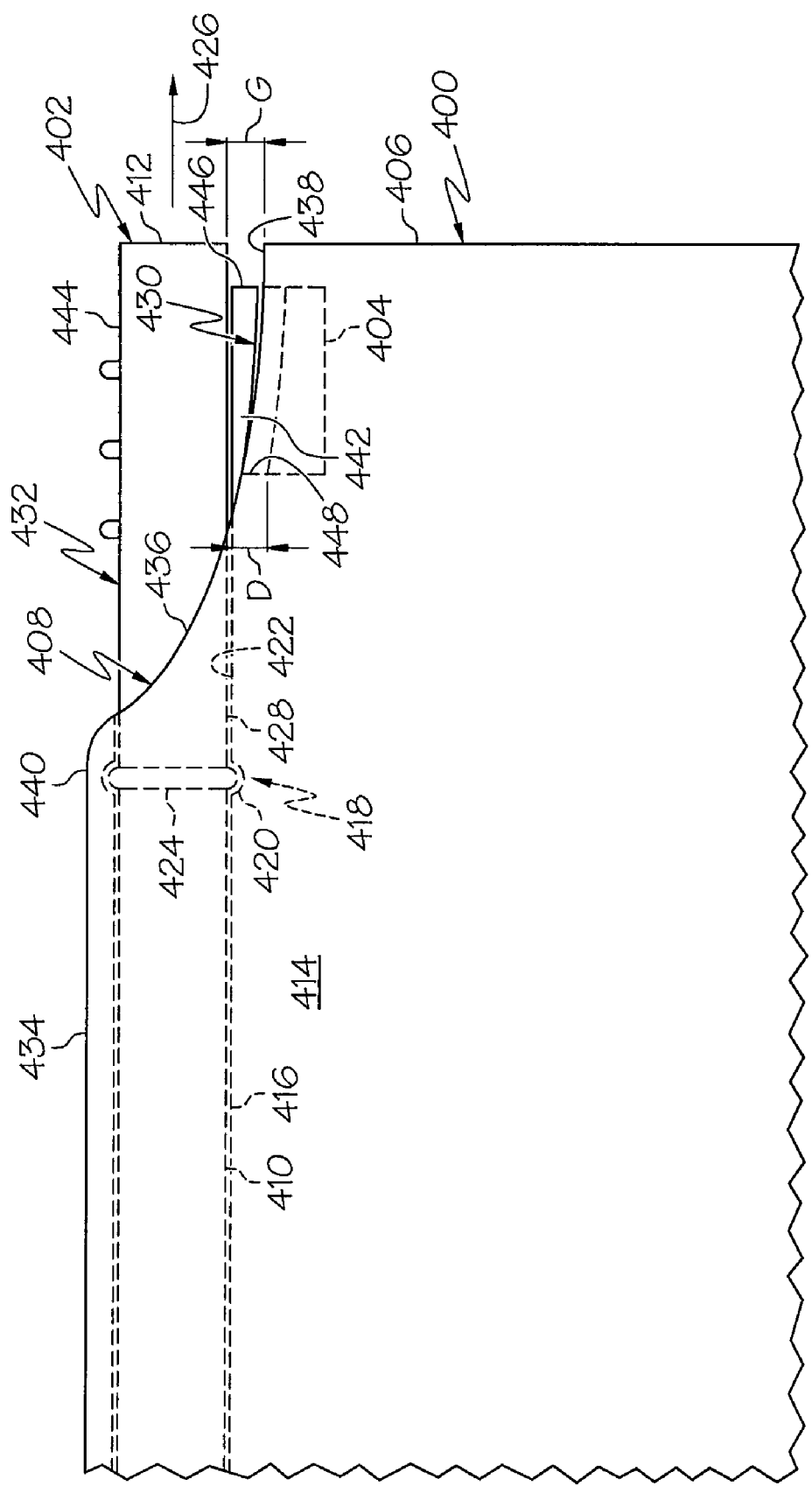
FIG. 4 is a partial side view of an example of an electronic device illustrating a stylus or other device in a stored position for operating a function button according to an exemplary embodiment of the present invention.

FIG. 4 is a partial side view of an electronic device 400 illustrating a stylus 402 or other device in a stored position for operating a function button 404 according to an exemplary embodiment of the present invention. The electronic device 400 may be a mobile communications device similar to the communications device 100 in FIG. 1. The electronic device 400 may also be the same as the communications device 200 and the stylus 402 may be the same as the stylus 206 of FIG. 2. The electronic device 400 may include a housing 406. An opening 408 may be formed in the housing 406 for inserting and storing the stylus 402 similar to the opening 210 in FIGS. 2 and 3B. The function button 404 is mounted in the housing 406. Similar to that previously described, the stylus 402 is adapted to operate the function button 404 when in a stored position inserted within the opening 408 and in response to a user applying a predetermined pressure to deflect the stylus 402 causing the function button 404 to be depressed into an operate position.

Similar to stylus 206, the stylus 402 may include an elongated portion 410 and a head portion 412. The elongated portion 410 may include a cross-section corresponding substantially to a shape or compatible with the shape of an opening 408 formed in the housing 406 for the elongated portion 410 to be received through the opening 408 and into an interior 414 of the housing 406 for storage.

A channel 416 may be formed in the interior 414 of the housing 406 for receiving the elongated portion 410 of the stylus 402. The channel 416 or the stylus 402 may include a feature 418 to releasably retain the stylus 402 in the stored position. For example, a groove 420 may be formed in an interior wall 422 of the channel 416 and the stylus 402 may have an annular ring 424 formed about the elongated portion 410. In the stored position, the annular ring 424 may slide into the groove 420 and be releasably captured thereby. The annular ring 424 and groove 420 are formed to retain the stylus 402 in the stored position for operating the function button 404 and with slight pressure in the direction of arrow 426 to permit the stylus 402 to be removed from the electronic device 400.

In another embodiment, the elongated portion 410 of the stylus 402 may flair or widen slightly toward the head portion 412 such that a flared portion 428 the stylus 402 contacts and is gripped by the interior wall 422 of the channel 416 to releasably retain the stylus 402 in the stored position. Slight pressure or force in the direction of arrow 426 may permit the stylus 402 to be released and removed from the electronic device 400.

As best illustrated in the embodiment shown in FIG. 4, a recess 430 may be formed in the housing 406 about the opening 408 or proximate to an entrance to the opening 408. The recess 430 may include a shape corresponding to a shape of the head portion 412 of the stylus 402. The head portion 412 may include an outer contour 432 or surface corresponding substantially to a contour 434 or surface of the housing 406 to cause the head portion 412 to provide a substantially uniform surface transition between the housing 406 and the head portion 412 when the stylus 402 is in the stored position.

The recess 430 may include a contoured section 436 or sloping section curving or sloping outwardly from a base 438 of the recess 430 to an outer edge 440 of the housing 406. The opening 408 may be formed in the contoured section 436 at a selected distance "D" above the base 438 of the recess 430 to provide a predetermined gap "G" between the head portion 412 of the stylus 402 and the function button 404 when the stylus 402 is in the stored position. In another embodiment, the dimensions "D" and "G" may be zero or negative in value such that the stylus 402 may fit in a recess in the base 438. In an exemplary embodiment, the head portion 412 is resiliently movable relative to the elongated portion 410 of the stylus 402 for operating the function button 404 when the stylus 402 is in the stored position.

The head portion 412 of the stylus 402 may include an operating face 442 for contacting and causing the function button 404 to be depressed when the user applies the predetermined force to an outer face 444 of the head portion 412 of the stylus 402 opposite to the operating face 442 of the stylus 402. The operating face 442 may include a ridge 446 for contacting and depressing the function button 404 when the user applies the predetermined force to the outer face 444 of the head portion 412 of the stylus 402. The function button 404 may be recessed a predetermined distance relative to a surface of the housing 406 or base 438 of the recess 430 in an aperture 448 formed in the housing 406 to prevent inadvertent operation of the function button 404. The ridge 446 may include a chosen structure to fit into the aperture 448 for depressing and causing operating the function button 404 when the user applies the predetermined force.

Figure 5:
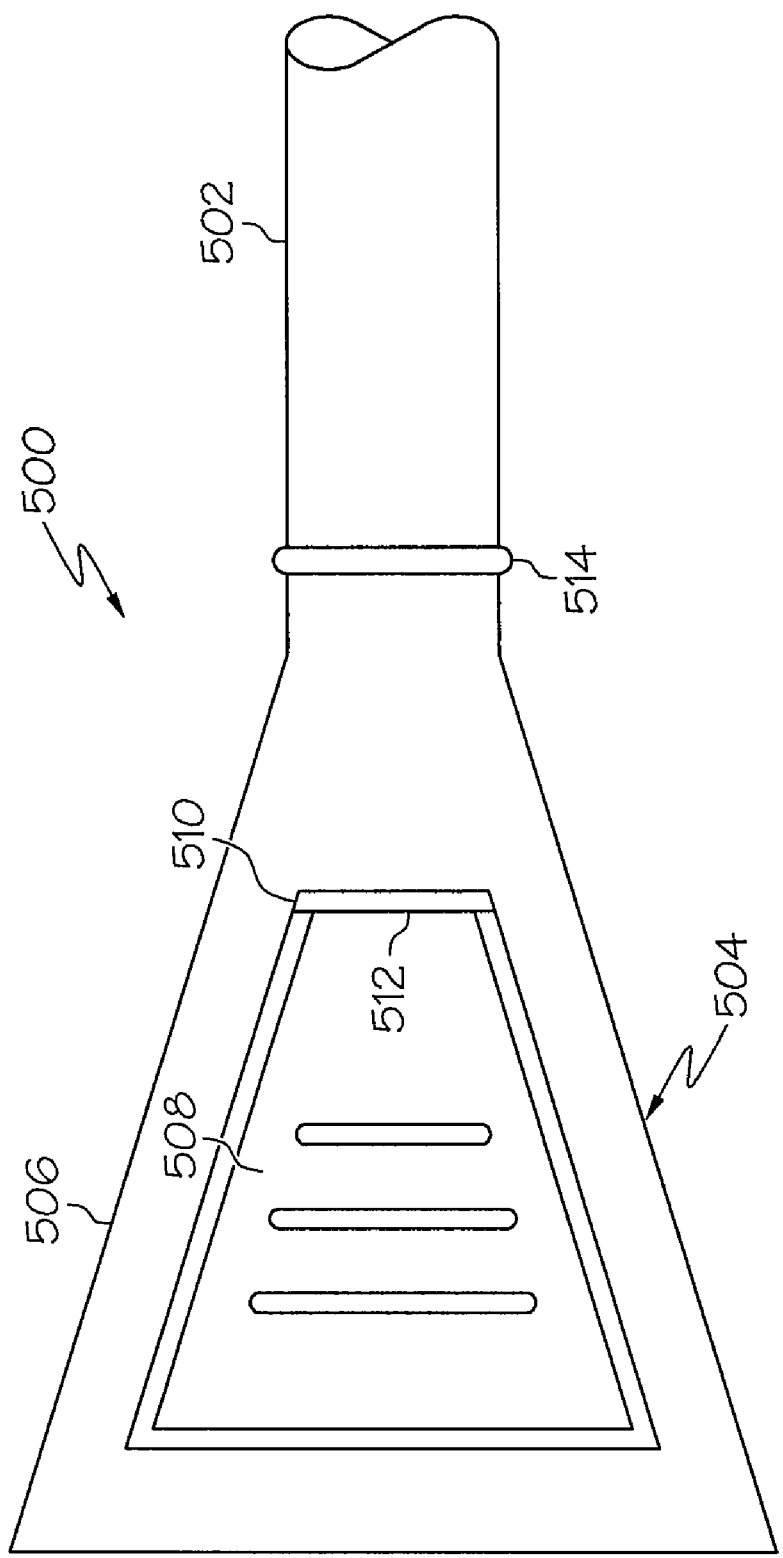
FIG. 5 is a partial view of a stylus for operating a function button mounted in an electronic device according to an exemplary embodiment of the present invention.

FIG. 5 is a partial view of a stylus 500 for operating a function button mounted in an electronic device according to an exemplary embodiment of the present invention. The stylus 500 may be used for the stylus 206 in FIGS. 2, 3A and 3B or stylus 402 in FIG. 4. The stylus 500 may include an elongated portion 502 similar to that previously described and a head portion 504. The elongated portion 502 may have a cross-section to be received by an opening in an electronic device. The head portion 504 may flair out from the elongated portion and may have a wider or larger cross-section than the elongated portion 502. The head portion 504 may include an outer section 506 and an inner or central section 508. The head portion 504 may also include a hinge arrangement 510 resiliently attaching the central section 508 to the outer section 506 of the head portion 504. The hinge arrangement 510 allows the central section 508 to pivot relative to the outer section 506 for operating the function button. The hinge arrangement 510 may be formed by separating the outer section 506 from the central section 508 on three sides and leaving a fourth side 512 of the central section 508 attached to the outer section 506 by a piece of material. The central section 508 may then be flexed relative to the outer section 506 to operation the function button. The stylus 500 may also include a retaining feature 514 for releasably retaining the stylus in a stored position in the electronic device and for aligning the central section 508 with the function button for proper operation of the function button. The retaining feature 514 may be an annular ring similar to that previously described or any arrangement for releasably retaining the stylus 500 in position and alignment with the function button when in the stored position within the electronic device. In another embodiment, the hinge arrangement 510 may be accommodated by material selection of the head portion 504 of the stylus 500 such that the central section 508 and the outer section 506 are one in the same and therefore move together to operate the function button.

Figure 6:
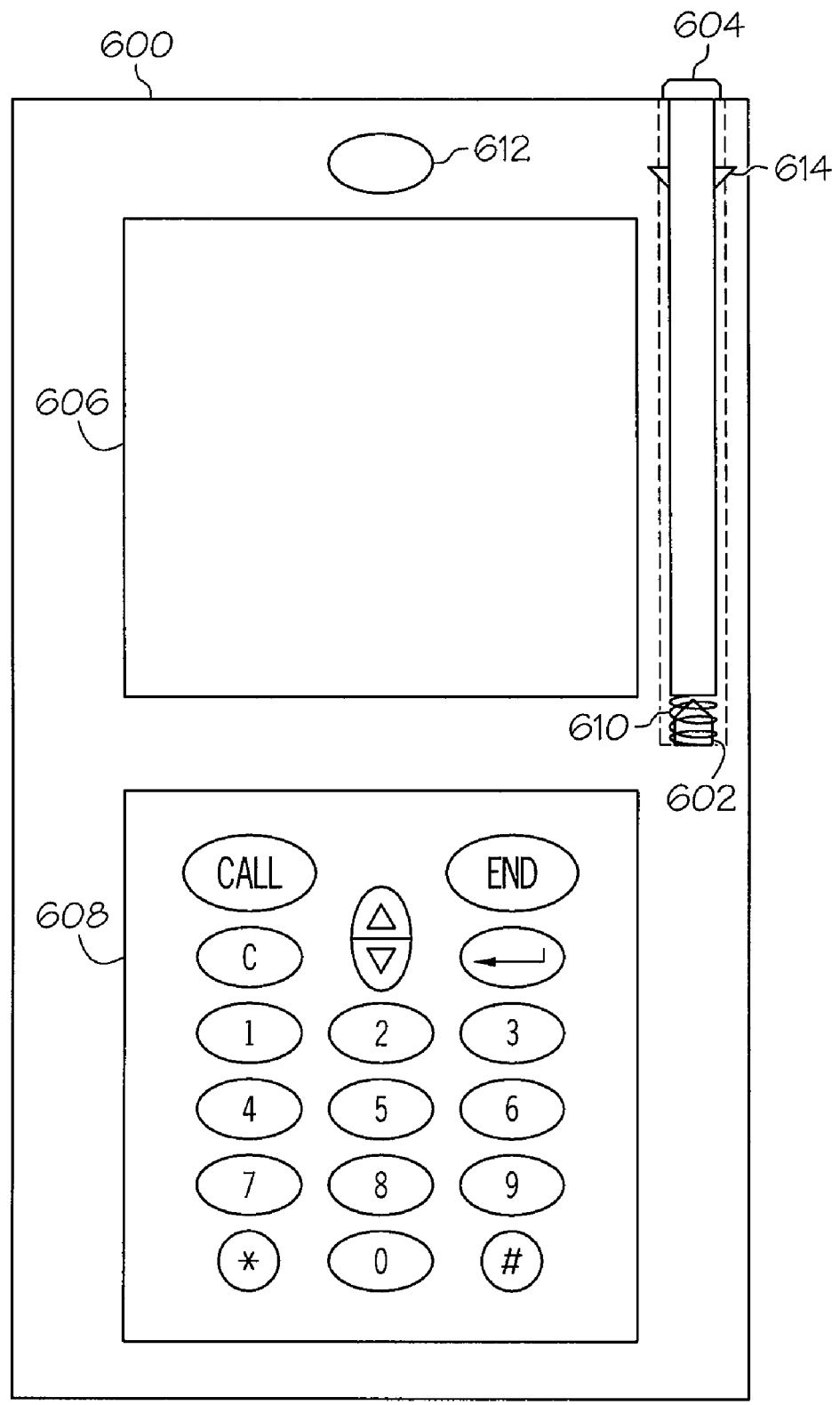
FIG. 6 is an illustration of an example of a communications device including a function button operable by a stylus or other device according to a further exemplary embodiment of the present invention.

FIG. 6 is an illustration of an example of an electronic device or communications device 600 including a function button 602 operable by a stylus 604 or other device according to a further exemplary embodiment of the present invention. In this embodiment, the function button 602 operable by the stylus may be internal to the communications device 600. The communications device 600 may include a display 606 and a keypad 608. The communications device 600 may be similar to the communications device 100 described with reference to FIG. 1.

The communications device 600 may also include a biasing means 610. The stylus 604 may be forced against the biasing means 610 to operate the function button 602 in response to the user applying the predetermined pressure to the stylus 604. The biasing means 610 returns the stylus 604 to a normal stored position where the function button 602 is not being operated when the predetermined pressure is released. The function button 602 may operate a camera 612 to take a photograph or video similar to that previously described herein. A mechanism 614, catch or other means may releasably retain the stylus 604 in a stored position. The mechanism 614 may also allow the stylus 604 to be depressed between an operate position for operating the function button 602 and a released position where the function button 602 is not be depressed or operated.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. An electronic device, comprising:
    a stylus;
    a housing;
    an opening formed in the housing for inserting and storing the stylus in a storage position; and
    a function button mounted in the housing,
    wherein the stylus, after being inserted and stored in the storage position, is adapted to activate the function button in response to a user applying a first predetermined pressure to the stylus,
    wherein the function button is deactivated in response to the user ceasing to apply to predetermined pressure to the stylus and
    wherein the function button is configured to activate directly in response to a user applying a second predetermined pressure while the stylus is removed from the opening.

2. The electronic device of claim 1, wherein the stylus comprises:
    an elongated portion including a cross-section compatible with a shape of the opening formed in the housing for the elongated portion to be received through the opening and into an interior of the housing for storage; and
    a head portion extending from the elongated portion, wherein the function button is mounted in the housing at a location proximate to the opening and the head portion is disposed adjacent the function button when the elongated portion of the stylus is substantially completely inserted into the opening for the head portion to contact and operate the function button in response to the user applying the first predetermined pressure to the head portion of the stylus.

3. The electronic device of claim 2, further comprising a channel formed in the interior of the housing for receiving the elongated portion of the stylus, wherein the channel includes a feature to releasably retain the stylus in the stored position.

4. The electronic device of claim 2, wherein the head portion of the stylus comprises a predetermined shape, wherein the predetermined shape of the head portion includes a cross-section wider than the cross-section of the elongated portion of the stylus.

5. The electronic device of claim 4, wherein the head portion of the stylus comprises an operating face for contacting and causing the function button to be depressed when the user applies the first predetermined force to an outer face of the head portion of the stylus opposite to the operating face of the stylus.

6. The electronic device of claim 5, wherein the operating face comprises a ridge for contacting and depressing the function button when the user applies the first predetermined force to the outer face of the head portion of the stylus opposite to the operating face of the stylus.

7. The electronic device of claim 6, wherein the function button is recessed a predetermined distance relative to a surface of the housing in an aperture formed in the housing to prevent inadvertent operation of the function button, wherein the ridge comprises a chosen structure to fit into the aperture for operating the function button when the user applies the first predetermined force.

8. The electronic device of claim 2, wherein the head portion is resiliently attached to the elongated portion to permit the head portion to move relative to the elongated portion when the stylus is in the stored position for operating the function button.

9. The electronic device of claim 2, further comprising a recess formed in the housing proximate to the opening, wherein the recess includes a shape corresponding to a shape of the head portion of the stylus and wherein the head portion comprises an outer contour corresponding substantially to a contour of the housing to cause the head portion to provide a substantially uniform surface transition between the housing and the head portion when the stylus is in the stored position.

10. The electronic device of claim 2, further comprising a recess formed in the housing and leading into the opening, wherein the recess comprises a contoured portion sloping or curving outwardly from a base of the recess to an outer edge of the housing, wherein the opening is formed in the contoured portion at a selected distance above the base of the recess to provide a predetermined gap between the head portion of the stylus and the function button when the stylus is in the stored position, and wherein the head portion is resiliently movable relative to the elongated portion of the stylus for operating the function button when the stylus is in the stored position.

11. The electronic device of claim 2, wherein the head portion comprises:
 an outer section;
 a central section; and
 a hinge arrangement resiliently attaching the central section to the outer section of the head portion, wherein the hinge arrangement allows the central section to pivot relative to the outer section, or both outer and central sections to pivot for operating the function button.

12. The electronic device of claim 1, further comprising a biasing means, wherein the stylus is forceable against the biasing means to operate the function button in response to the user applying the first predetermined pressure to the stylus and wherein the biasing means returns the stylus to a normal stored position where the function button is not being operated when the first predetermined pressure is released.

13. The electronic device of claim 1, further comprising a camera, wherein the function button operates the camera to take a photograph.

14. The electronic device of claim 13, further comprising a mobile communications device.

15. A mobile communications device, comprising:
 a housing:
 a transmitter and a receiver contained in the housing for establishing two way wireless communications;
 a processor contained in the housing for controlling operation of the communications device;
 a stylus;
 an opening formed in the housing for inserting and storing the stylus in a storage position; and
 a function button mounted in the housing,
 wherein the stylus, after being inserted and stored in the storage position, is adapted to activate the function button in response to a user applying a first predetermined pressure to the stylus,
 wherein the function button is deactivated in response to the user ceasing to apply to first predetermined pressure to the stylus, and
 wherein the function button is configured to activate directly in response to a user applying a second predetermined pressure while the stylus is removed from the opening.

16. The mobile communications device of claim 15, further comprising a camera, wherein the function button operates the camera for taking a photograph.

17. The mobile communications device of claim 16, further comprising another function button mounted in the housing for operating the camera.

18. The mobile communications device of claim 15, wherein the stylus comprises:
 an elongated portion including a cross-section compatible with the shape of the opening formed in the housing for the elongated portion to be received through the opening and into an interior of the housing for storage; and
 a head portion extending from the elongated portion, wherein the function button is mounted in the housing at a location proximate to the opening and the head portion is disposed adjacent the function button when the elongated portion of the stylus is substantially completely inserted into the opening for the head portion to contact and operate the function button in response to the user applying the first predetermined pressure to the head portion of the stylus.

19. The mobile communications device of claim 15, further comprising a biasing means, wherein the stylus is forceable against the biasing means to operate the function button in response to the user applying the first predetermined pressure to the stylus and wherein the biasing means returns the stylus to a normal stored position where the function button is not being operated.

20. A method for operating a function button mounted in an electronic device, comprising:
 inserting a stylus into a stored position through an opening formed in a housing of the electronic device;
 activating, after inserting the stylus into the stored position, the function button in response to a user applying a first predetermined pressure to the stylus,
 wherein the stylus is positioned relative to the function button mounted in the housing of the electronic device when the stylus is in the stored position to permit activation of the function button when the first predetermined pressure is applied to the stylus,
 deactivating the function button in response to the user ceasing to apply the first predetermined pressure to the stylus, and
 activating the function button directly in response to the user applying a second predetermined pressure while the stylus is removed from the opening.

21. The method of claim 20, wherein inserting the stylus into the stored position through the opening formed in the housing comprises:

inserting an elongated portion of the stylus through the opening, wherein the elongated portion of the stylus includes a cross-section compatible with the shape of the opening formed in the housing for the elongated portion to be received through the opening and into an interior of the housing for storage; and disposing a head portion of the stylus extending from the elongated portion adjacent the function button when the elongated portion of the stylus is substantially completely inserted into the opening for the head portion to contact and operate the function button in response to the user applying the first predetermined pressure to the head portion of the stylus.

\* \* \* \* \*